Figure 1:
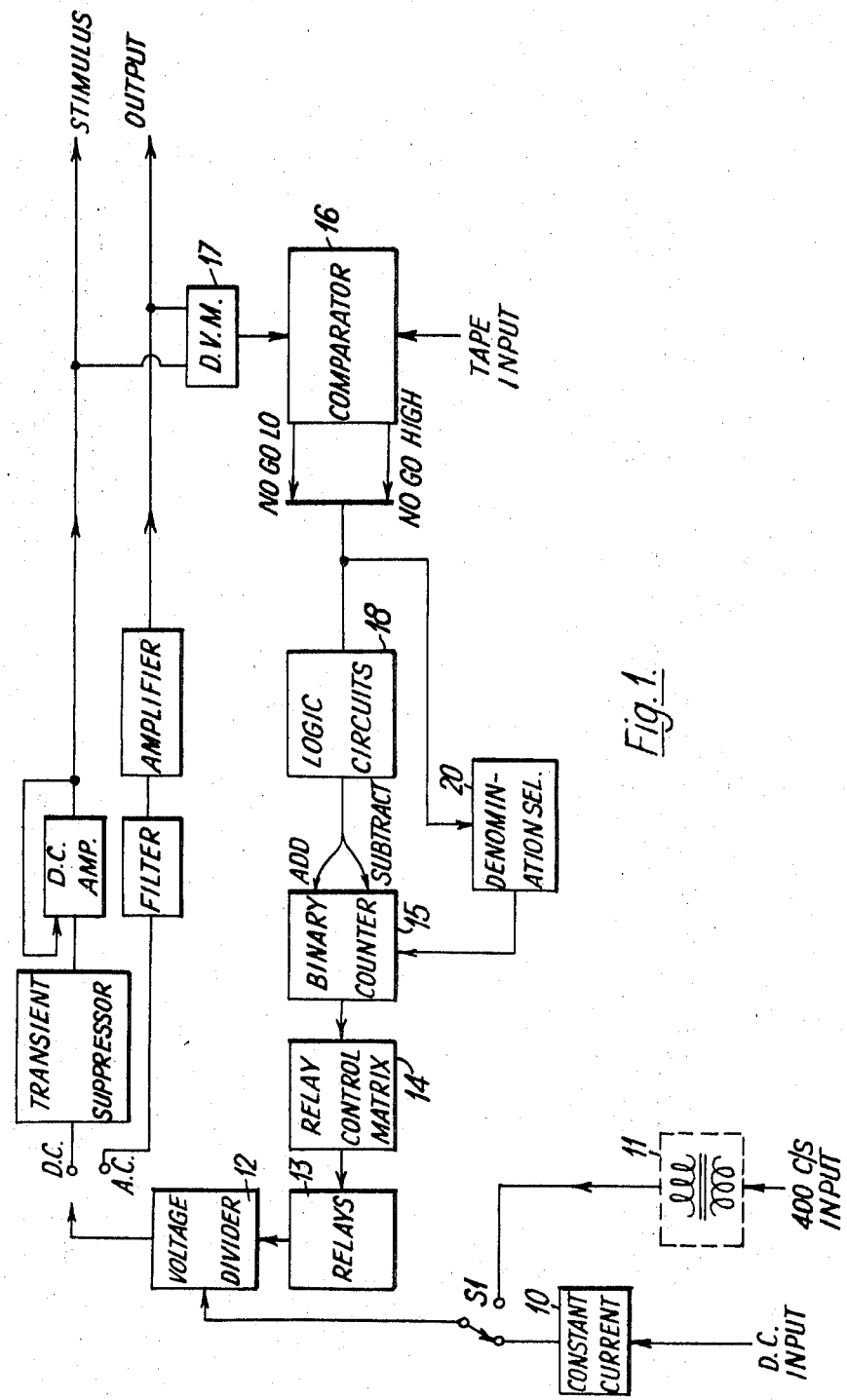

United States Patent

[11] 3,569,821

[72] Inventor Ronnie Pepper
 Luton, England
[21] Appl. No. 795,307
[22] Filed Jan. 30, 1969
[45] Patented Mar. 9, 1971
[73] Assignee British Aircraft Corporation Limited
 London, England

[54] PROGRAMMABLE DIGITAL TO ANALOGUE CONVERTER SYSTEM
 3 Claims, 2 Drawing Figs.
[52] U.S. Cl. .................................................. 323/66,
 323/79, 323/81, 324/115, 340/347
[51] Int. Cl. .................................................. G05f 1/10
[50] Field of Search........................................ 323/9, 64,
 65, 66, 74, 79, 80, 81; 324/99 (D), 115,
 (Inquired); 340/347 (A—D), (Inquired)

[56] References Cited
UNITED STATES PATENTS
3,187,323 6/1965 Flood et al.................. 340/347
3,270,275 8/1966 Latham, Jr. ................. 323/79

Primary Examiner—J. D. Miller
Assistant Examiner—G. Goldberg
Attorney—Kemon, Palmer and Estabrook ABSTRACT: Automatic test equipment requires highly accurate test signals. The maintenance of a substantially constant input, accurately defined within precise limits, insures such a test signal. A digital comparator wherein the measured values of the responses to the test signals are compared with predetermined values available from a programmed tape is also employed to maintain the signal constant.

PROGRAMMABLE DIGITAL TO ANALOGUE CONVERTER SYSTEM

In automatic test equipment where test signals are injected at preselected test points into the equipment being tested, it is important that a range of test signals should be available which can be set up as quickly and as accurately as possible. An essential part of any test equipment is the comparator where the measured values of the responses to the test signals are compared with predetermined values inserted into the comparator from a programmed tape. The present invention is concerned with a method of using the comparator in the test equipment to set up the test signals for application to selected points of the equipment being tested.

According to the present invention apparatus for setting up the test signal comprises a constant voltage source, a voltage divider energized from the source, an analogue-to-digital voltage converter for converting the output from the divider into digital form, a digital comparator for comparing the value measured by the said converter with predetermined upper and lower limit values and means for varying the tapping point to vary the output from the voltage divider in response to an output from the comparator indicating that the said measured value lies outside the limiting values. The output from the divider is thereby automatically ramped up or down until the said measured value lies within the limiting values.

In a preferred form of the invention the voltage divider is split into sections representing different denominations of the measured value, the voltage increments across adjacent sections being in the ratio of the radix of the numerical system. Initially, all the sections are in circuit to give the maximum possible voltage. The tapping point is then varied in the first section until the comparator output indicates that, for the denomination represented by that section, the output from the voltage divider lies within the limits previously fed into the comparator from a programmed tape, i.e. it is higher than the lower limit but lower than the upper limit. Assuming that the remaining denominations are not all zero, this point will be reached when the output from the comparator changes from NO GO LO to a NO GO HIGH. This transition is sensed by a denomination selector which switches the ramp search to the next most significant denomination. This procedure continues until a final value is reached in the least significant denomination which does not produce a NO GO LO or a NO GO HIGH.

Figure 2:
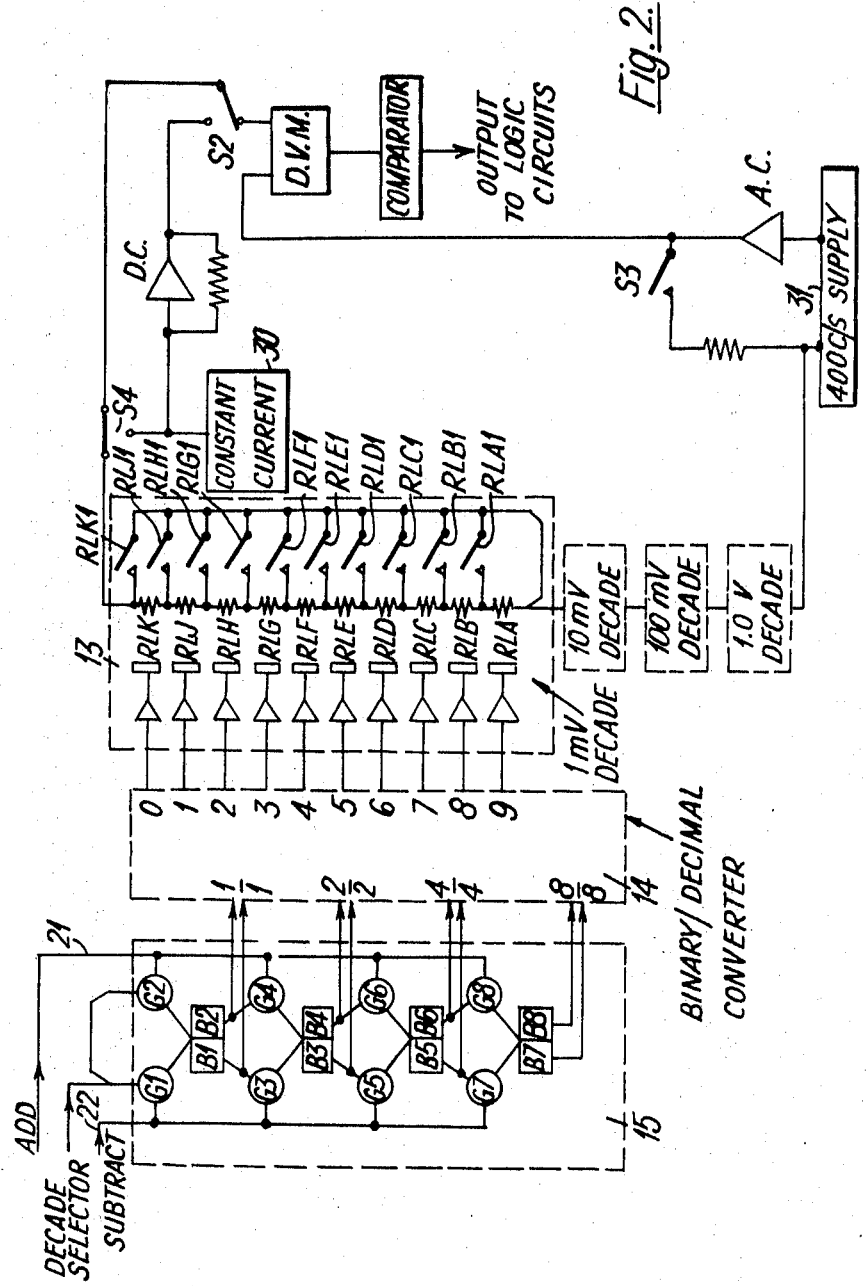

One example of the invention is shown in the accompanying drawings in which:

FIG. 1 is a block diagram of a circuit for setting up a test signal in automatic test equipment for application to selected points of the equipment being tested; and FIG. 2 is a circuit diagram of a portion of the block diagram shown in FIG. 1.

Referring to FIG. 1 the basic voltage for the test signal is derived from a DC input or from a stabilized 400 c./s. input. The DC input is connected to a constant current source 10 and the AC input is supplied through an input transformer 11. The choice of AC or DC voltage is governed by the position of the switch S1 which is connect to the voltage divider 12. The output from the voltage divider is fed through AC or DC amplifying circuits to provide the test signal. To set up this signal, and to keep it accurately maintained with predetermined limit values, the signal is measured by the digital volt meter 17 and fed to a digital comparator 16 which has been loaded from a programmed tape with the upper and lower limits of the required test signal.

The output from the comparator is transformed by logic circuits 18 into add or subtract signals which are fed to the binary counter 15. This count is used to control the output from the voltage divider by closing predetermined relays 13, the contacts of which are connected to tapping points on the voltage divider. A relay control matrix 14 produces a representation of the binary count appropriate to the numerical system being used. In this example, the voltage divider is split into sections representing different denominations of the numerical system and the binary count is applied in turn to the different sections by means of the denomination selector 20.

FIG. 2 shows in more detail how the signals from the comparator are used to control the output from the voltage divider. The voltage divider comprises a chain of resistors connected to the constant current source 30 or to the stabilized 400 c./s. input 31 by means of the ganged switches S2, S3, S4, shown in the AC position. The resistor chain consists of four resistors corresponding in this example to four decades of the required test signal. In FIG. 2, only one of these resistors is shown in detail. It has a value of 10 ohms with tappings at intervals of 1 ohm to provide voltage steps of 1 millivolt. The tapping points are connected to the relay contacts RLA1 to RLK1. The remaining decades are not shown in detail but comprise resistors of values 9,000 ohms, 900 ohms and 90 ohms with tappings at intervals of 1,000 ohms, 100 ohms and 10 ohms; respectively to provide voltage steps of 1 volt, 100 millivolts, and 10 millivolts respectively.

Initially, all the resistors are in circuit giving a total of 10,000 ohms. The bistables controlling the relays are triggered by the leading positive edges of pulses representing NO GO LO or NO GO HIGH outputs from the comparator which appear as "add" or "subtract" signals on the lines 21 and 22 feeding into the binary counter 15. The search for the correct test signal commences in the most significant decade i.e. the decade having 1 volt steps. Ramping occurs in single steps, one decade at a time. At each step, the digital volt meter measures the required signal level and loads the comparator to check if the measured signal is within the programmed limits. Ramping by decade considerably reduces the search time, particularly when four significant figures are not required.

After the initial comparison the comparator will probably signal NO GO. If the measured signal is too low, a NO GO LO output will appear from the comparator. This produces a stepping pulse closing a single relay contact in the first decade. The process is repeated and each time a NO GO LO reappears the decade is raised a further step. If the upper and lower limits are close, the high decade steps will probably move straight from a NO GO LO to a NO GO HIGH as the limit is passed. This transition is sensed by the denomination selector 20 (FIG. 1) which produces an inhibit pulse preventing any further stepping in the first decade and switching the search to the next most significant decade. Stepping now commences in the next decade and the operation continues until the measured value is within limits, when the NO GO pulses will cease to step the decades. Thus lower decades are only stepped if the limits demand it.

Considering the 1 millivolt decade shown in FIG. 2, the relay contacts RLA1 to RLK1 are energized in response to the count of the bistable circuits B1—B8, the binary count being converted to a decimal representation by a binary decimal converter (not shown in detail). Thus, if the measured value of the test signal is too low the count in the binary counter 15 is progressively increased by "add" signals until sufficient relay contacts are closed to bring the output voltage from the voltage divider between the limiting values set into the comparator. At this point a GO signal is produced from the comparator signifying that the test signal lies within the limits.

I claim:

1. Apparatus for setting up a test signal in automatic test equipment for application to selected points of the equipment being tested, comprising:
    a. a constant voltage source;
    b. a voltage divider energized from said source and having a plurality of sections, the voltage increments across adjacent ones of the said sections being in the ratio of the radix of the numerical system in which the value of the required test signal is to be expressed such that each section represents a different denomination of the said numerical value;
    c. a plurality of tapping points positioned along said divider;
    d. means for selecting at least one of said tapping points to control the output voltage from said divider;

e. an analogue to digital voltage converter connected to receive the output from said divider and convert it to digital form;
f. a digital comparator having a first input connected to receive the digital representation of the output from said divider and second and third inputs connected to receive predetermined upper and lower limit values respectively of the test signal;
g. means responsive to an output from said comparator signifying that said digital representation lies below the lower limit value to energize said selector means to select a tapping point providing a higher output voltage;
h. means responsive to an output from said comparator signifying that said digital representation lies above the upper limit value to energize said selector means to select a tapping point providing a lower output voltage; and
i. means responsive to a direct transition of the output from said comparator from a signal signifying that said digital representation lies below the lower limit to a signal signifying that said digital representation lies above the upper limit to energize said selector means to select a tapping point in an adjacent section of said divider representing the next most significant denomination, whereby the output from said voltage divider is continually ramped up or down until said digital representation lies within said limit values.

2. Apparatus according to claim 1 in which each section of said voltage divider includes a plurality of tappings to enable different numerical values to be selected within each denomination.

3. Apparatus according to claim 2 for use with decimal notation in which said voltage divider comprises a resistor chain, each resistor corresponding to one decade and the tapping points in each decade being connected to relay contacts for short circuiting the portion of the resistor between a respective tapping and one end of the resistor, and in which the said selector means comprises a plurality of bistable circuits for selectively energizing the relays associated with said relay contacts in response to triggering pulses from said comparator, the bistables forming a binary counter for each decade and said triggering pulses comprising "add" or "substract" signals corresponding to the digital representation lying below the lower tolerance limit or above the upper tolerance limit respectively, and each binary counter being connected to a binary decimal converter such that said relay contacts are successively closed along each resistor in turn in accordance with the binary count for the corresponding decade.